US 6,556,338 B2

(12) United States Patent
Han et al.

(10) Patent No.: US 6,556,338 B2
(45) Date of Patent: Apr. 29, 2003

(54) MEMS BASED VARIABLE OPTICAL ATTENUATOR (MBVOA)

(75) Inventors: Naiqian Han, Sunnyvale, CA (US); Liji Huang, San Jose, CA (US)

(73) Assignee: Intpax, Inc., Cupertino, CA (US)

( * ) Notice: Subject to any disclaimer, the term of this patent is extended or adjusted under 35 U.S.C. 154(b) by 0 days.

(21) Appl. No.: 10/003,811

(22) Filed: Nov. 2, 2001

(65) Prior Publication Data

US 2002/0080465 A1 Jun. 27, 2002

Related U.S. Application Data

(60) Provisional application No. 60/245,452, filed on Nov. 3, 2000, and provisional application No. 60/268,612, filed on Feb. 14, 2001.

(51) Int. Cl.$^7$ .................. G02B 26/08; G02B 26/00; G02B 6/00
(52) U.S. Cl. .................. 359/298; 359/290; 359/291; 359/295; 359/298; 385/140
(58) Field of Search .................. 359/290, 291, 359/295, 298, 583, 584, 585, 586, 587, 588, 589, 722, 247, 578; 385/140

(56) References Cited

U.S. PATENT DOCUMENTS

| 5,943,155 A | * | 8/1999 | Goossen | 359/247 |
| 5,949,571 A | * | 9/1999 | Goossen et al. | 359/291 |
| 6,215,579 B1 | * | 4/2001 | Bloom et al. | 359/298 |
| 6,275,324 B1 | * | 8/2001 | Sneh | 359/291 |
| 6,304,709 B1 | * | 10/2001 | Fujita | 385/140 |
| 6,339,493 B1 | * | 1/2002 | Scalora et al. | 359/290 |
| 6,341,039 B1 | * | 1/2002 | Flanders et al. | 359/578 |
| 6,373,632 B1 | * | 4/2002 | Flanders | 359/578 |

* cited by examiner

Primary Examiner—Evelyn Lester
Assistant Examiner—Jack Dinh
(74) Attorney, Agent, or Firm—Bo-In Lin (57) ABSTRACT

The present invention discloses an optimized optical attenuator device. It includes the design of resonator formed by two identical mirrors, which are made by MEMS process. The structure realizes the minimum insertion loss. The two membranes are chosen to be with high reflection rate. Multiple layer or metal layer or mixture of them can produce membrane of high reflection rate. High reflection rate causes low tuning voltage for one certain attenuation range.

19 Claims, 5 Drawing Sheets

MEMS BASED VARIABLE OPTICAL ATTENUATOR (MBVOA)

This Application claims a priority date of Nov. 3, 2000 and Feb. 14, 2001 benefited from a previously filed Provisional Patent Application No. 60/245,452 filed on Nov. 3, 2000 and a previously filed Provisional Patent Application No. 60/268,612 filed on Feb. 14, 2001 by the Applicants of this Formal Patent Application.

BACKGROUND OF THE INVENTION

1. Field of the Invention

This invention relates generally to apparatus and methods for designing MEMS based optical and photonic devices for fiber optical transmission systems. More particularly, this invention is related to the optimization of the configuration of optical and photonic variable attenuators for use in optical communication sub-system or system.

2. Description of the Related Art

Even that early development of mechanical variable attenuator, as that disclosed in U.S. Pat. No. 6,144,794, entitled "Motor driven optical fiber variable attenuator", provides good optical performances and compact mechanical size, which is better than many other mechanical variable attenuators in the market, this type of attenuators have several limitations. Specifically, the patented mechanical variable attenuator comprises a motor, which actuates a lead screw to move rotatably, and a nut associated with the lead screw to move linearly. A neutral density filter moves along with the linearly moving nut wherein the filter is positioned between two spaced collimators for providing linear attenuation changes of light transmitted therebetween. Due to the mechanical structure and designs, the device has intrinsic disadvantages of poor reliability, high power consumption, low tuning speed and large size. A group new technical approaches based on micro electromechanical system (MEMS) are launched to achieve the production of optical devices with low power consumption, small size, high speed and high reliability.

Recent developments of the mechanical anti-reflection switch (MARS) for implementation as optical variable attenuator are still faced with a technical limitation. The configuration is mostly employed as a single layer membrane and silicon substrate, which forms a Fabry-Perot resonator. Static electronic force causes the membrane move back and forth, so that the gap of the resonator formed by the membrane and the substrate changes. The attenuation of the light within one certain wavelength range is achieved due to close to or far away from the resonance frequency. However, the MARS design is suffered of large insertion loss, extremely non-linear voltage/attenuation curve and relatively high tuning voltage. These are all design intrinsic problems according to current state of art configurations. Basically, the single layer of silica nitride with low refraction index does not have high reflection rate, e.g., 30%. Accordingly, a high tuning voltage must be applied. Secondly, though the design is to achieve the same reflection rate, the uncontrollable manufacture process-deviations cause reflection rate differences, which dramatically affect the insertion loss performance of the device, especially when the reflection rate is designed to be higher. Thirdly, MARS designs are implemented with a configuration to place the output port along the reflection direction. Theoretical analyses prove that such configuration has poor linearity of voltage/attenuation curve and very large residual insertion loss.

Based on the principle of the well-known Fabry-Perot interferometer constructed by Charles Fabry and Alfred Perot in 1897, Goossen discloses in U.S. Pat. Nos. 5,943,155 and 5,949,571, entitled "MARS Optical Modulators", a double polysilicon MARS (mechanical anti-reflection switch) device where the shorting between the lower polysilicon metalization and the silicon substrate is prevented by providing an insulating layer on the surface of the silicon substrate. Goossen teaches a modulator configuration using the reflection modulation of the Fabry-Perot interferometer with improved reliability. The disclosures made by these prior patents are hereby incorporated as reference in this Application. The configuration disclosed by Goossen however is far away from an optimized design structure according to above descriptions of the technical difficulties now still encountered by those of skill in the art in MARS design and manufacture.

Another recent development for variable attenuator device is by fabricating a group of membrane-based strips. David M. Bloom disclosed in U.S. Pat. No. 6,215,579: Method and apparatus for modulating an incident light beam for forming a two-dimensional image. The apparatus includes a plurality of elongated elements each having a reflective surface. The elongated elements are suspended substantially parallel to each other above a substrate with their respective ends supported, forming a column of adjacent reflecting surfaces grouped according to display elements. Alternate ones of each group are deformable by a applying a voltage with respect to the substrate. An approximately flat center section of each deformed element is substantially parallel to and a predetermined distance from a center section of each undeformed element. A light beam incident to the column of adjacent reflecting surfaces is reflected from a group of elongated elements when the alternate ones are undeformed and diffracted when alternate ones are deformed. A distance of movement is controlled or a ratio of between reflection and diffraction periods determines the display intensity for the corresponding display element. Diffracted light is collected by a lens and reflected by a scanning mirror into an eyepiece or onto a display screen.

The same apparatus of the invention is used to make a variable attenuator device. These strips form an optical grating. Each individual strip can be tuned by electronic static force. The strips are divided into two groups. The input light hits the strips at almost a normal direction and responses back to output. Since one group of the strips can be changed due to electronic static force, the interference of the two groups will cause the power variation according to the wavelength change of input light or the distance change of the two strip groups. A variable attenuator device can be achieved by means of this method. One key disadvantage of this structure is the grating is not high efficient device. Between the two adjacent strips, there should be a gap, so that the strip can move freely without touch each other. The gap will cause attenuation to the light that passes through thus increases the basic insertion loss of attenuation device. Furthermore, the device has another disadvantage that there is a non-linear relationship between voltage and attenuation. Based on the interference theory, the linearity variations can cause extreme adversity to optical performance at the high attenuation area, which in turn causes control problem for electronic circuit.

The third MEMS approach for variable attenuator device is to implement micro-mirrors in optical devices. According to the data from research and prototyping sources, the poor reliability of these micro mirrors in these types of devices become a critical concerns preventing the micro-mirror based MEMS optical devices from practically useful. There are mainly two reasons that cause the poor reliability performance. First, the mirror is supported on a hinge. Manufacture of a mirror hinge is often becomes the most difficult step in applying a wafer-based process for producing a MEMS device. Furthermore, as the micro mirrors rotate around the hinge, electrical charges and heat are generated. It becomes very serious when the mirror rotates for million times. Mirror also needs a relative large moving range, so that the light can be attenuated to a value required by an optical signal transmission system. The large tuning range worsens the difficulty by further degrading the already-poor reliability. According to results of the simulation analyses, most MEMS mirror structure is with a natural frequency of several KHz. This means it is very difficult to pass the vibration test that is necessary for the application of components in telecommunication system. In general, the mirror-based MEMS device is faced with tremendous problems of poor reliability, instability due to sensitivity to vibrations and slow tuning speed.

Therefore, a need still exists in the art in the field of the optical signal transmission systems to provide a configuration and method of manufacture to provide an optimized variable attenuator such that the limitations encountered by current MARS configuration can be overcome. It is further desirable that device is controlled by smart control system to compensate the attenuation while temperature and wavelength shift, so that the attenuation can be fixed regardless the outside environment or input wavelength.

SUMMARY OF THE PRESENT INVENTION

It is therefore an object of the present invention to provide new and improved configuration and methods for optimized design and manufacturing of MEMS based optical/photonic attenuators controlled by separate control circuits. The innovative design includes: multiple layers are made to form the membrane with high reflection rate which forms the resonator; two identical membrane are designed by the same fabrication process; transmission port is used as output port of device; the residual basic mode of MEMS resonator is designed to match the input mode; anti-reflection coating on every interface in the optical path; the conductive is chosen as the layers face to face, there should be no dielectric material to trap the charges between the positive and negative electrodes; an electronic control circuit with temperature and wavelength compensation functionality makes the MEMS device with fixed attenuation at one certain desired attenuation value without variation according to the temperature and wavelength change.

These new configurations produce an optical variable attenuator device with low insertion loss, low wavelength dependent loss (WDL), low temperature dependent loss (TDL), low ripple, and large attenuation range with low voltage range. The present invention also tolerant relatively large manufacturing process-deviations and hence significantly reduces the production cost.

BRIEF DESCRIPTION OF THE REFERENCE AND DRAWINGS

DETAILED DESCRIPTION OF THE PREFERRED EMBODIMENT

Figure 1:
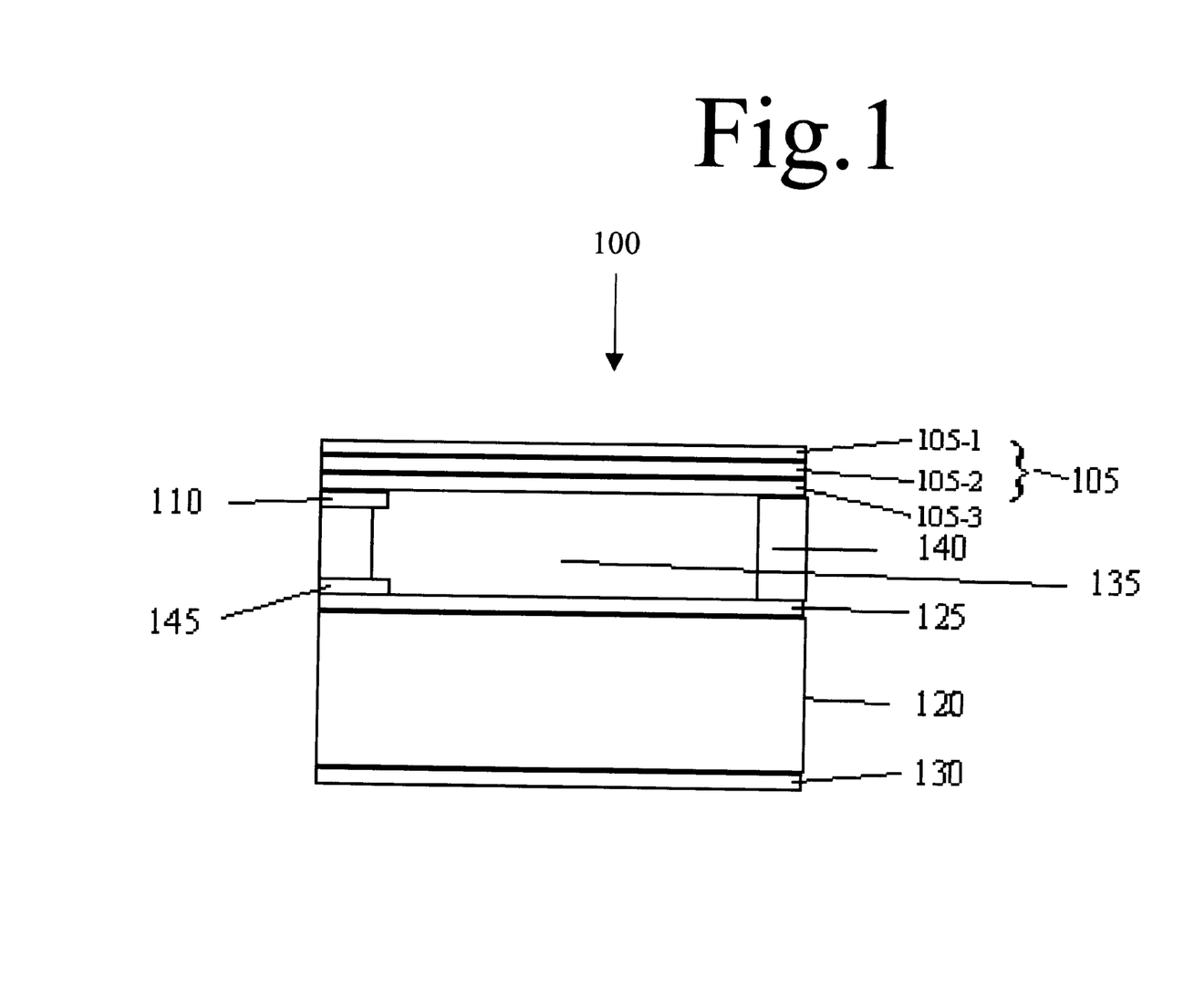
FIG. 1 is a cross sectional view of basic cell of MEMS attenuator device of this invention with a three-layer membrane.
Figure 2A:
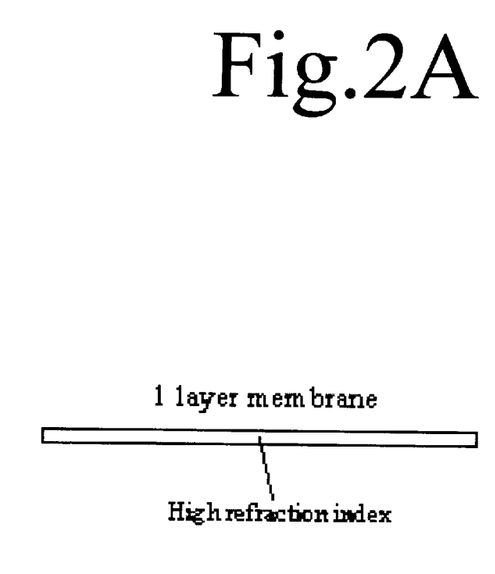
FIG. 2A and FIG. 2B are a cross sectional view of membrane having a one layer and five layers.
Figure 2B:
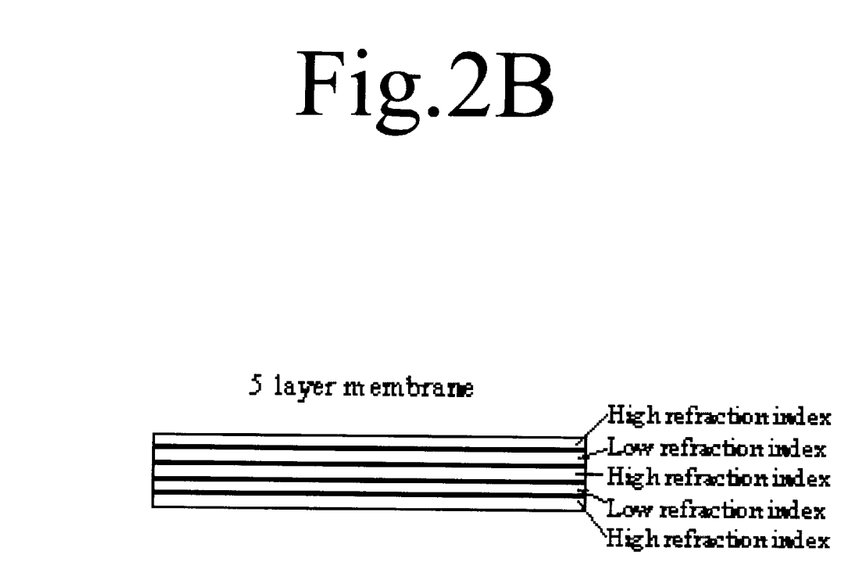

Referring to FIG. 1 for the cross sectional view of a basic optical MEMS attenuator cell that is voltage tunable according to the design principles disclosed in this invention to be further discussed below. The optical MEMS attenuator 100 is formed with tunable membrane 105 by applying a voltage on an electrode 110 to adjust the distance of a gap between the membrane 105 and the supporting substrate 120 coated with an upper and lower antireflective (AR) coatings 125 and 130. The gap is formed as part of a light transmission chamber 135 surrounded by chamber wall 140. An electrode 145 is also provided in the substrate 120 for more flexibly adjusting the membrane tuning voltage. The membrane 105 is formed with three layers. These three layers includes a layer 105-1 of high refraction index, a middle layer 105-2 of low refraction index and a bottom layer 105-3 of high refraction index. For the purpose of increasing the tuning range of attenuation, a membrane 105 with a high reflection rate is employed. By employing a membrane of multiple layers or a single membrane of high reflection rate can achieve the purpose of providing a membrane 105 of high reflection rate. In FIG. 2A, a single layer membrane with high refraction index causing high reflection rate, e.g., 50%, is employed. In FIG. 2B, five layers are cascaded to form the membrane which causes a much higher reflection rate. The five cascaded layers consisted of alternately one high refraction index layer against another layer of low refraction index. For example, a membrane 105 of 50% reflection rate is formed with the single layer shown in FIG. 2A, 90% reflection rate by using three-layer structure shown in FIG. 1 and 95% reflection rate by cascading five layers as shown in FIG. 2B. The tuning range of the attenuation is increased when a high reflection rate membrane is employed. The antireflective coatings 125 and 130 are employed with very low reflective rate about 0.1% to 0.3% to reduce the ripple effects.

Figure 3:
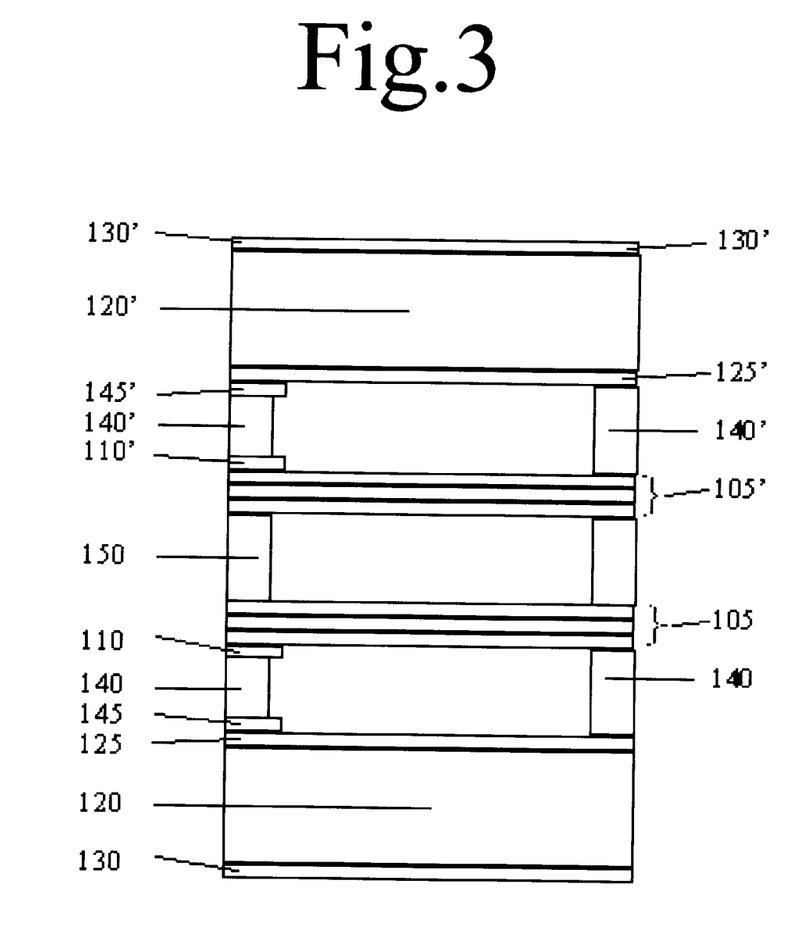
FIG. 3 is a cross sectional view of a face-to-face duel-cell-bonded configuration of this invention.

FIG. 3 shows another preferred embodiment of an attenuator by bonding face-to-face two attenuators as that shown in FIG. 1. These two bonded attenuators are identical and designated with symmetrical alphanumeric designations. Since these two bonded attenuators are identical, they are produced by a same set of manufacture processes such that the difference of reflection rates between two membranes 105 and 105' due to manufacturing process deviations is substantially eliminated. The insertion loss is minimized when the difference in reflection rates between the membranes 105 and 105' is minimized. Again, the reflection rate of the membrane 105 and 105' can be selected as 50%, 90% or 95% implemented with single layer, three-layer of five-layer membrane as explained above. The gap between two membranes 105' and 105 formed as the MEMS resonator is formed as half wavelength or its integer times of working light wavelength, such as 1550 nm, so that the minimum attenuation value can be achieved at zero voltage. When the gap between two membranes is formed as half wavelength of working light wavelength, the lowest residual wavelength dependent loss is also achieved. Also, the antireflection coatings 125, 125', 130 and 130' are implemented to reduce the ripple effects caused by unexpected cross coupling of resonant effects from neighboring resonators.

A MEMS optical attenuator with low insertion, large tunable attenuation range, low ripple and low WDL, TDL performance is achieved by implementing innovative device configuration and smart electronic control system. The membrane is formed by MEMS process and causes a tunable resonator with gap of half wavelength or its integer times value about one micrometer. This small gap can be tuned with about 10 volts. Since it is voltage sensitive device, the power consumption is very small, less than 50 mw compared with normal mechanical variable attenuator with up to 1 w power consumption. The device can be made on silicon wafer. The membrane moves according to the voltage change, so that it attenuates the light differently at different location in the moving.

Figure 4:
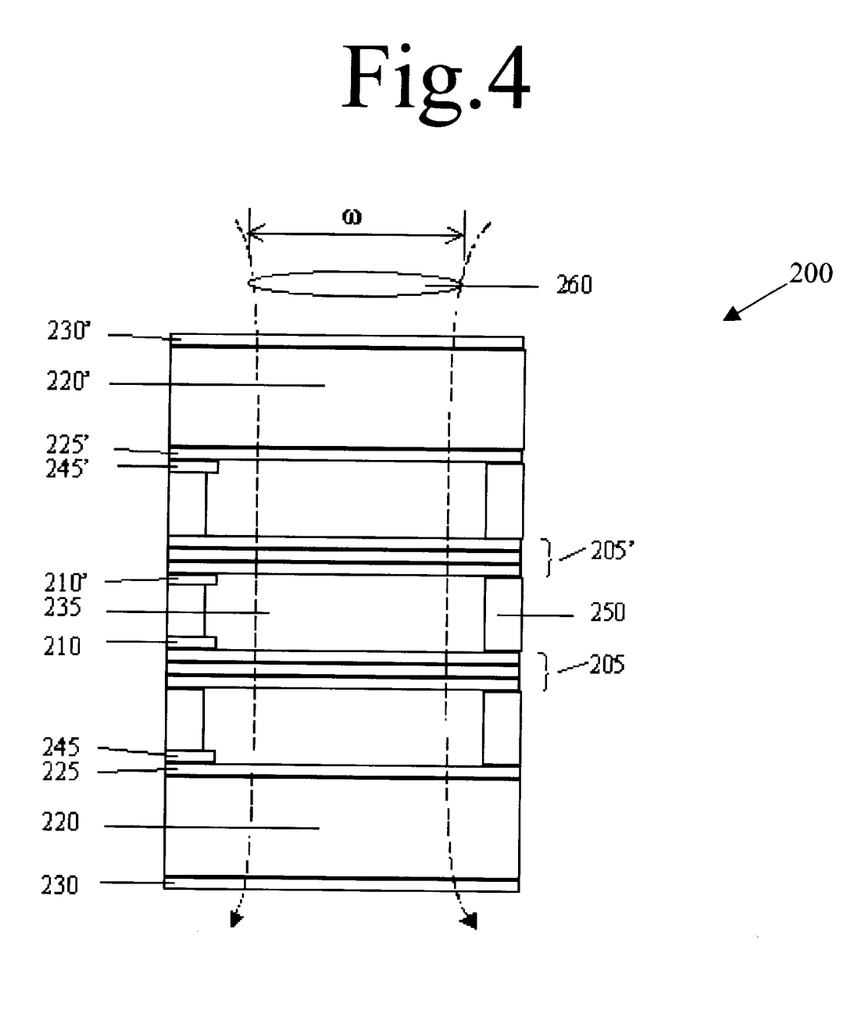
FIG. 4 is a cross sectional view of an attenuator for showing the electrode configuration in order to get rid of the charging effect and the input mode configuration in order to achieve maximum coupling coefficient.

Referring to FIG. 4 for an incident beam 260 having a beam spot diameter ω incident to the attenuator 200. The optical MEMS attenuator 200 has a first and second tunable membranes 205 and 205'. The tuning of the membranes is by applying a voltage on two face to face positive electrodes 210 and 245 and two face to face negative electrodes 210' and 245'. The positive and negative voltages are applied to adjust the distance of a gap between the membrane 205 and 205' supported on the substrates 220 and 220'. The supporting substrates 220 and 220' are coated with upper and lower antireflective (AR) coatings 225 and 230 and 225' and 230'. The gap between two membranes 205 and 205' is formed as part of a light transmission chamber 235 surrounded by chamber wall 250. With an attenuator as shown to receive an input beam 260, theoretical result shows that the insertion loss changes with degree of match of the input Gauss beam and the residual cavity mode. When the incident beam 260 is an optical output from a collimator, the field distribution at optical waist location can be expressed as below $$E_{in} = \sqrt{\frac{2}{\pi}} \cdot \frac{1}{\overline{\omega}} \cdot e^{-\frac{\rho^2}{\overline{\omega}^2}} \cdot e^{-ikz} \quad (1)$$

Where $\overline{\omega}$ is the optical waist.
The field distribution in resonator is normally chosen as symmetrical Lagual Gauss field. In practical design, the field is always chosen to be residual basic mode. The field distribution can be expressed as $$E_{residual} = \sqrt{\frac{2}{\pi}} \cdot \frac{1}{\overline{\omega}_0} \cdot e^{-\frac{\rho^2}{\overline{\omega}_0^2}} \quad (2)$$

Where $\overline{\omega}0$ defines the basic mode of MEMS resonator.
The coupling coefficient of the input mode and residual mode is $$\eta = \frac{\left(\int\int E_{in} \cdot E^*_{residual} \cdot r \cdot dr \cdot d\psi\right)^2}{\int\int E_{in} \cdot E^*_{in} \cdot r \cdot dr \cdot d\psi \cdot \int\int E_{residual} \cdot E^*_{residual} \cdot r \cdot dr \cdot d\psi} \quad (3)$$

Combining Equations (1), (2) and (3), a functional relationship exists that a best coupling coefficient is achieved when $\overline{\omega}=\overline{\omega}_0$, $\eta=1$ and the residual mode is the same as the optical waist size of the input beam 260. Also, the optical waist of input beam should be at the center location of resonator. The optical waist of the residual mode can be designed by choosing the dimension of the resonator, curvature of the membrane and the length of the gap.

Furthermore, for coupling efficiency improvement, even that a perfect match between two modes cannot be achieved, a higher degree of matching between the input beam to the residual basic mode leads to a higher coupling coefficient with a reduced insertion loss.

Specifically, in FIG. 4, the attenuator 200 is designed such that the input mode of the incident beam 260 matches the residual basic mode to maximize the coupling coefficient. The residual mode of the resonator is selected by designing the resonator with particular dimension and shape. The cavity length, transverse dimension and the curvature of the membranes define the resonator mode. The input light mode is given by the outside source. The dimension and the layout of the resonator are carefully selected to generate a matched mode in the resonator, which exactly matches the input mode. Normally, the input mode is a Gauss beam. There are many eigenmodes in a given cavity. There is only one basic mode. The input mode generates the basic mode and other higher level modes. If the resonator is designed to match the input mode, the power of those high level modes will sacrifice, since higher level modes are with very low coupling coefficient when a basic Gauss mode inputs the resonator. Accordingly, the higher level modes are practically not useful. Therefore, for practical implementation, the residual basic mode of the resonator 235 in FIG. 4 is selected to match the input mode of the incident beam 260.

Figure 5A:
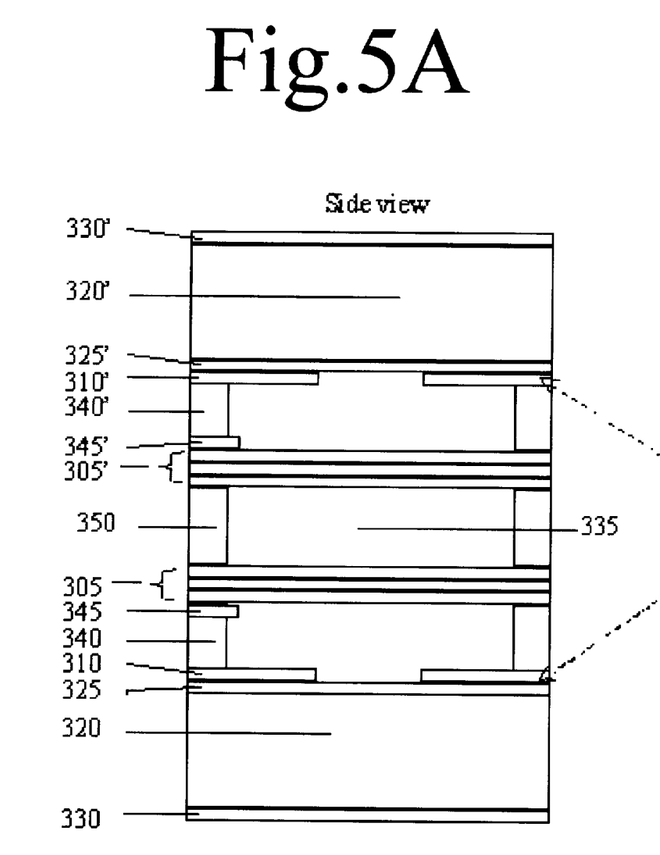
FIG. 5A and FIG. 5B are a cross sectional view of another electrode configuration of this invention for eliminating the charging effect.
Figure 5B:
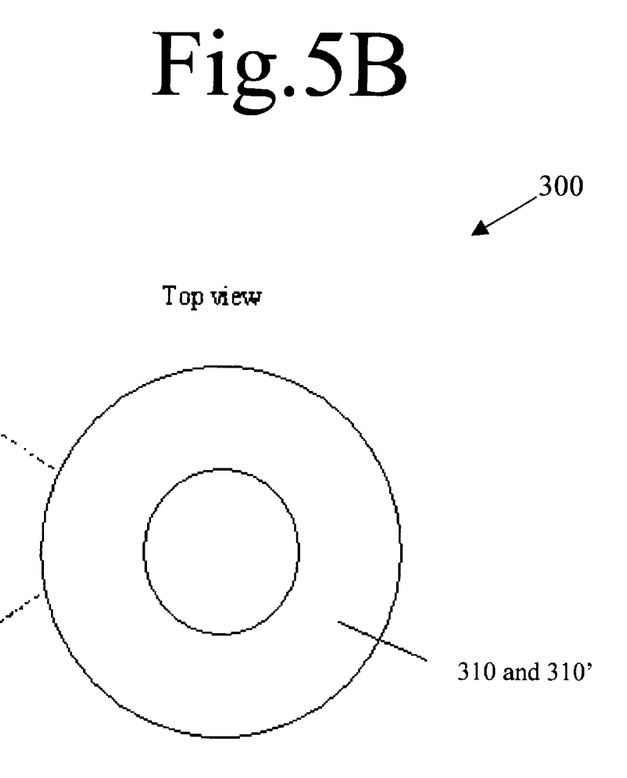

Referring to FIG. 3 and FIG. 4 again, since the antireflection layers on the silicon substrate will trap charges which cause variation of the control voltage, the electrode has to be placed face to face in order to get rid of the charging effect. Furthermore, the conductive layer should be placed face to face. Between the two positive and negative electrodes, there should be no dielectric material to trap the charges. There are two structures can realize the goal, which are shown in FIG. 4 and FIGS. 5A and 5B. In FIG. 4 the electrode is placed at conductive layer, which is the "face" of the resonator. In FIGS. 5A and 5B, the faces are not put the electrodes on it. But two moving membranes and the electronic force generator are placed face to face. That is the reason the metal layer is covered on the silicon nitride layer. The charging issue is eliminated by the structure that greatly simplifies the control circuit design. In FIGS. 5A and 5B, when compared with the structure shown in FIG. 4, the electronic field is applied on the two cavities instead of one. The configuration enables a reduced voltage because two voltage sources are now applied to effectuate the gap changes.

In a real MEMS device, there are several ripple generators. The ripple seriously deteriorates the performance of DWDM system, especially when cascade attenuators are employed. In order to eliminate the ripple caused by unexpected resonator effect, an anti-reflection coating is coated on every interface along the light path.

Referring to FIGS. 5A and 5B for a cross sectional view of another preferred embodiment of an attenuator 300 of this invention that includes a top conductive ring 310' and a conductive bottom surface 310 respectively to function as electrodes of this invention. The optical MEMS attenuator 300 has a first and second tunable membranes 305 and 305'. The tuning of the membranes is by applying the voltages on two pairs of face to face positive-negative electrodes 310 and 345 and 310' and 345'. The positive and negative voltages are applied to adjust the distance of a gap between the membrane 305 and 305' supported on the substrates 320 and 320'. The supporting substrates 320 and 320' are coated with upper and lower antireflective (AR) coatings 325 and 330 and 325' and 330'. The gap between two membranes 305 and 305' is formed as part of a light transmission chamber 335 surrounded by chamber wall 350. The top and bottom conductive rings 310' and 310 are employed to face with another electrode 345' and 345 respectively to reduce the charge build up such that the problems of attenuation vibrations and delay of membrane response can be minimized. As shown in FIG. 5B, ring-shaped conductive layers are implemented to reduce the optical transmission loss when the conductive layers are formed with lower optical transparency, such as metal material.

According to above descriptions, a micro-electro-mechanical system (MEMS) device supports on a conductive substrate is disclosed. The MEMS device includes an electrically tunable membrane having an optically transparent portion. The MEMS device further includes one or multiple layers of membrane to form a resonator. The membrane is designed to have a higher rate of reflection rate. The resonator is further adjusted by a voltage control for tuning the transmission of an optical signal through the resonator to satisfy a system requirement. The resonator is provided to attenuate the optical signal whereby the MEMS device constitutes an optical attenuator. The resonator further utilizes an electronic control system to compensate the temperature and wavelength changes so that the attenuation is maintained fixed under a range of temperatures and a range of wavelength. In a preferred embodiment, the membrane utilizes multiple layers to form membrane of an increased rate of reflection. In another preferred embodiment, the multiple layer membrane is formed by alternately cascading high and low refraction index layers. In another preferred embodiment, the MEMS device is formed with a pair of membranes produced by manufacturing processes simultaneously performed having substantially identical rate of reflection such that the insertion loss may be minimized and a tuning range of attenuation may be maximized. In another preferred embodiment, the MEMS device is produced with a configuration having a residual basic mode matching an input mode of an incident beam to produce best coupling coefficient for achieving a minimum insertion loss. For the purpose of providing a membrane of high reflection rate, the membrane includes multiple layers wherein one of these layers may be a dielectric layers or a metal layers depending on the system specification of the attenuator. For pure dielectric membrane, the multi-layer structure with alternating high-low refraction indexes is preferred to achieve high reflection rate. The curve of the membrane should be large enough, which means the thickness of the cavity should be small enough compared with the transverse dimension of the resonator.

This invention further discloses an optical attenuator device utilizes the electrodes on the face to face layers to eliminate the charging problem. Between the moving membrane and another conductive layer, there is no dielectric material. The configuration is provided to eliminate the problem of charging buildup to achieve an improved attenuator performance. However, since the electric breakdown affects the safety of MEMS device when face to face layers are designed to be conductive, one or two very thin dielectric layers can be placed between conductive layers in order to dramatically improve the breakdown voltage. The selection of very thin dielectric layers would not generating serious charge effect by carefully selecting the material and its thickness. The attenuator further utilizes anti-reflection layer on every interface in the optical path of the MEMS device to eliminate the unexpected resonator effect, which causes ripple. The problem of ripple is resolved and the damage to the DWDM system is substantially eliminated for a DWDM system that utilizes cascade attenuators.

This invention further discloses attenuator with improved configuration to compensate ripple effects generated from multiple resonators. The design combines with the package design. The thickness of the two or more substrates which form the MEMS device have one certain relationship, so that one of the ripples shift a Pi phase compared with another, as in a ripple generated by two resonators structure. For more than two resonators, the total effect is the ripple compensating each other. In a preferred embodiment, an optical attenuator device utilizing one or more than one special designed coating layers as compensation layer. Both the reflection rate and the thickness of the layer are designed to eliminate the ripple generated by every individual resonator. Particularly, a best structure to realize the identical mirror is to form a resonator bonded with two basic MEMS cells face to face such as that shown in FIGS. 3 to 5. Two membranes of the two cavities form a resonator. The two membranes are identical due to the same process. The structure reduces the manufacture requirement of the MEMS device and achieves high quality product with low cost. For the purpose to eliminate the charging effect, the electrodes are placed on the two moving membrane or placed on the membrane and the substrate. When the electrodes are placed on the membrane and substrate, the metal layer on the anti-reflection coating layer is one electrode. The metal layers are provided as rings that have a transparent opening for a light transmission therethrough. In order to make the input mode match with the basic residual mode, the shape and size of the membrane is designed to generate the residual basic mode in the resonator that matches the input Gauss beam.

According to above descriptions, a micro-electro-mechanical system (MEMS) device supports on a substrate is disclosed by this invention. The MEMS device includes an electrically tunable membrane having an optically transparent portion for transmitting an optical signal through an optical path therethrough wherein the membrane having a reflection rate of at least 50%. The MEMS device further includes a plurality of optical path interfaces for the optical signal to transmit from a first material medium to a second material medium of different refraction indexes and an antireflection (AR) layer is disposed on each of the interfaces between the first material medium and second material medium. In a preferred embodiment, the electrically tunable membrane comprising at least two membrane layers wherein each of the membrane layer having alternately a relative high and then a relative low refraction index between adjacent membrane layers. In a preferred embodiment, the electrically tunable membrane comprising three membrane layers wherein each of the three membrane layer having alternately a relative high and then a relative low refraction indexes between adjacent membrane layers. In a preferred embodiment, the electrically tunable membrane comprising five membrane layers wherein each of the five membrane layers having alternately a relative high and then a relative low refraction indexes between adjacent membrane layers. In a preferred embodiment, the MEMS device further includes a resonator comprising the electric tunable membrane as a first electric tunable membrane and a second electric tunable membrane opposite the first electric tunable membrane wherein the first and second electric tunable membranes having a substantially same reflection rate. In a preferred embodiment, the MEMS device further includes a resonator comprising the electric tunable membrane as a first electric tunable membrane and a second electric tunable membrane opposite the first electric tunable membrane by bonding a second MEMS device manufactured together with the MEMS device whereby the first and second electric tunable membranes having a substantially same reflection rate. In a preferred embodiment, the MEMS device further includes conductive layers for functioning as electrodes for electrically tuning the membrane wherein the conductive layers disposed directly facing each other without an intermediate dielectric layer and constituting face-to-face conductive layers. In a preferred embodiment, the MEMS device further includes conductive layers for functioning as electrodes for electrically tuning the membrane wherein the conductive layers disposed directly facing each other with an intermediate dielectric layer with a thickness less than a charge-buildup thickness is disposed between the conductive layers constituting breakdown preventive face-to-face conductive layers. In a preferred embodiment, at least two of the conductive layers are ring-shaped conductive layers. In a preferred embodiment, the MEMS device further includes a resonator having a particular transverse width, cavity length, and membrane curvature for providing a basic resonator residual mode to match a specified incident beam. In a preferred embodiment, the MEMS device further includes a resonator having a resonator residual mode represented by a residual parameter $\bar{\omega}_0$ wherein the residual parameter is particularly designed to match a beam diameter $\bar{\omega}$ of an incident beam whereby $\bar{\omega}=\bar{\omega}_0$. In a preferred embodiment, the MEMS device further includes an optical attenuator device comprising a voltage control means for electrically tuning the membrane. In a preferred embodiment, the MEMS device further includes an environmental compensation control means for electronically control the attenuator for compensating environmental performance variations. In a preferred embodiment, the environmental compensation control means further comprising a temperature compensation control means for electronically control the attenuator for compensating temperature performance variations. In a preferred embodiment, the environmental compensation control means further comprising a wavelength-shift compensation control means for electronically control the attenuator for compensating wavelength-shift performance variations.

A micro-electro-mechanical system (MEMS) device supports on a substrate is therefore disclosed in this invention that includes a first and a second multi-layer membranes formed as two high reflection-rate membranes functioning as two mirrors of a resonator. In a preferred embodiment, the multi-layer membranes comprising a plurality of layers with a sequence of alternating high-low refraction indexes whereby the membranes are provided with high reflection rates for increasing a tunable attenuation range and reducing a tuning voltage. In a preferred embodiment, the first and second multi-layer membranes are manufactured contemporaneously by employing an identical set of processing steps on a same semiconductor wafer. In a preferred embodiment, the first and second multi-layer membranes having a substantially identical reflection rate.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A micro-electro-mechanical system (MEMS) device supports on a substrate comprising:

an electrically tunable membrane having an optically transparent portion for transmitting an optical signal through an optical path therethrough wherein said membrane having a reflection rate of at least 50%; and a plurality of optical path interfaces for said optical signal to transmit from a first material medium to a second material medium of different refraction indexes and an antireflection (AR) layer is disposed on each of said interfaces between said first material medium and second material medium; and transmission spectrum is employed to fabricate the MEMS device.

2. The MEMS device of claim 1 wherein:

said electrically tunable membrane comprising at least two membrane layers wherein each of said membrane layer having alternately a relative high and then a relative low refraction index between adjacent membrane layers. If chosen one layer, the layer should be with high refraction index.

3. The MEMS device of claim 1 wherein:

said electrically tunable membrane comprising three membrane layers wherein each of said three membrane layer having alternately a relative high and then a relative low refraction indexes between adjacent membrane layers. The top and bottom layers should be with high refraction index.

4. The MEMS device of claim 1 wherein:

said electrically tunable membrane comprising five membrane layers wherein each of said five membrane layers having alternately a relative high and then a relative low refraction indexes between adjacent membrane layers. The top and bottom layers should be with high refraction index.

5. The MEMS device of claim 1 further comprising:

a resonator comprising said electric tunable membrane as a first electric tunable membrane and a second electric tunable membrane opposite said first electric tunable membrane wherein said first and second electric tunable membranes having a substantially same reflection rate.

6. The MEMS device of claim 1 further comprising:

a resonator comprising said electric tunable membrane as a first electric tunable membrane and a second electric tunable membrane opposite said first electric tunable membrane by bonding a second MEMS device manufactured together with said MEMS device whereby said first and second electric tunable membranes having a substantially same reflection rate.

7. The MEMS device of claim 1 further comprising:

conductive layers for functioning as electrodes for electrically tuning said membrane wherein said conductive layers disposed directly facing each other without an intermediate dielectric layer and constituting face-to-face conductive layers.

8. The MEMS device of claim 7 wherein:

at least two of said conductive layers are ring-shaped conductive layers if they are un-transparent conductive material.

9. The MEMS device of claim 1 further comprising:

conductive layers for functioning as electrodes for electrically tuning said membrane wherein said conductive layers disposed directly facing each other with an intermediate dielectric layer with a thickness less than a charge-buildup thickness is disposed between said conductive layers constituting breakdown preventive face-to-face conductive layers.

10. The MEMS device of claim 1 further comprising:
a resonator having a particular transverse width, cavity length, and membrane curvature for providing a basic resonator residual mode to match a specified incident beam.

11. The MEMS device of claim 1 further comprising:
a resonator having a resonator residual basic mode represented by a residual parameter $\bar{\omega}_0$ wherein said residual parameter is particularly designed to match the input mode with optical waist a beam diameter $\bar{\omega}$ of an incident beam whereby $\bar{\omega}=\bar{\omega}_0$.

12. The MEMS device of claim 1 further comprising:
an optical attenuator device comprising a voltage control means for electrically tuning said membrane.

13. The MEMS device of claim 1 further comprising:
an environmental compensation control means for electronically control said attenuator for compensating environmental performance variations.

14. The MEMS device of claim 13 wherein:
said environmental compensation control means further comprising a temperature compensation control means for electronically control said attenuator for compensating temperature performance variations.

15. The MEMS device of claim 13 wherein:
said environmental compensation control means further comprising a wavelength-shift compensation control means for electronically control said attenuator for compensating wavelength-shift performance variations.

16. A micro-electro-mechanical system (MEMS) device supports on a substrate comprising:
a first and a second multi-layer membranes formed as two high reflection-rate membranes functioning as two mirrors of a resonator; and
transmission spectrum is employed to fabricate the MEMS device.

17. The MEMS device of claim 16 wherein:
said multi-layer membranes comprising a plurality of layers with a sequence of alternating high-low refraction indexes whereby said membranes are provided with high reflection rates for increasing a tunable attenuation range and reducing a tuning voltage.

18. The MEMS device of claim 16 wherein:
said first and second multi-layer membranes are manufactured contemporaneously by employing an identical set of processing steps on a same semiconductor wafer.

19. The MEMS device of claim 16 wherein:
said first and second multi-layer membranes having a substantially identical reflection rate.

* * * * *